Dec. 22, 1964   J. REGENSTEIN, JR., ETAL   3,162,152
METHOD OF APPLYING A PESTICIDE
Filed Feb. 27, 1963   2 Sheets-Sheet 1
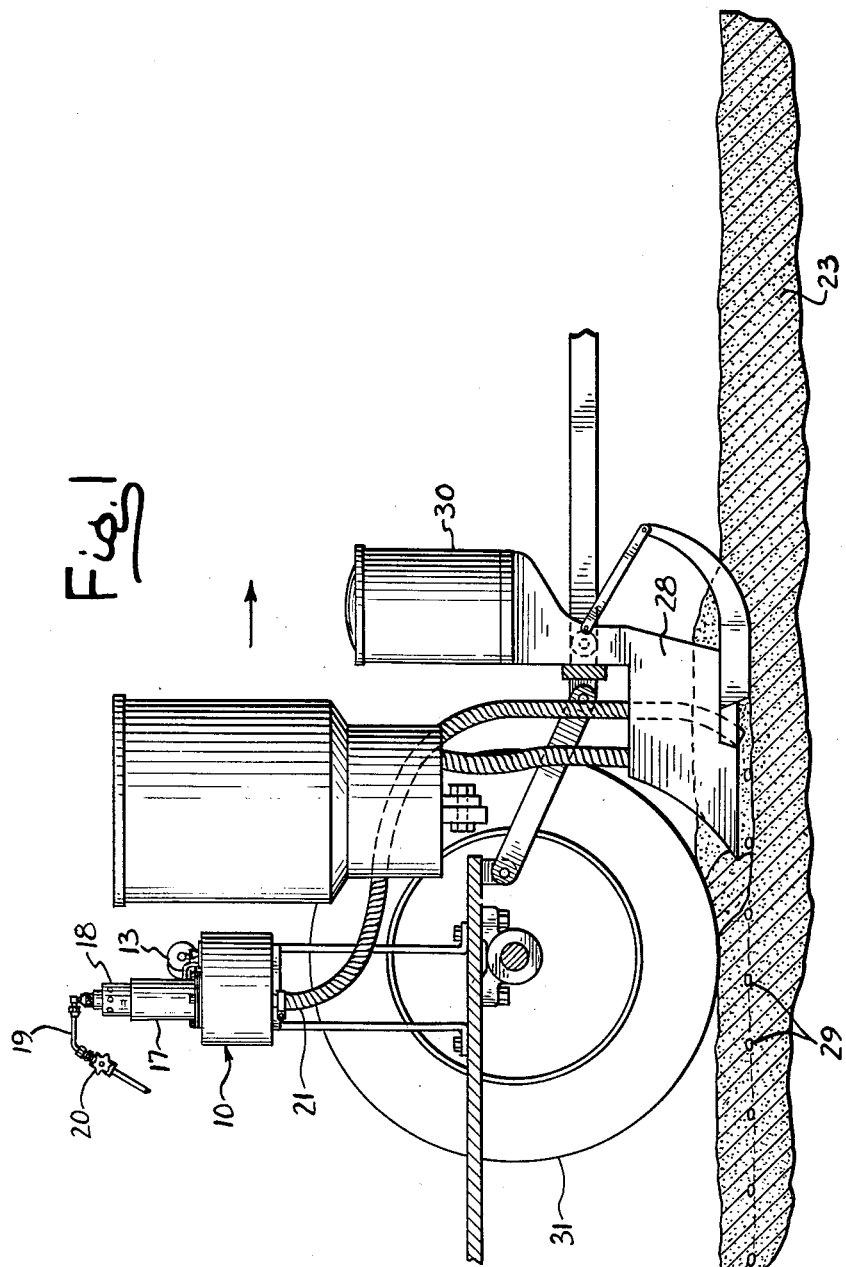
INVENTORS
JOSEPH REGENSTEIN, JR.
EUGENE P. ORDAS
BY
Gary, Desmond & Parker
ATTYS.

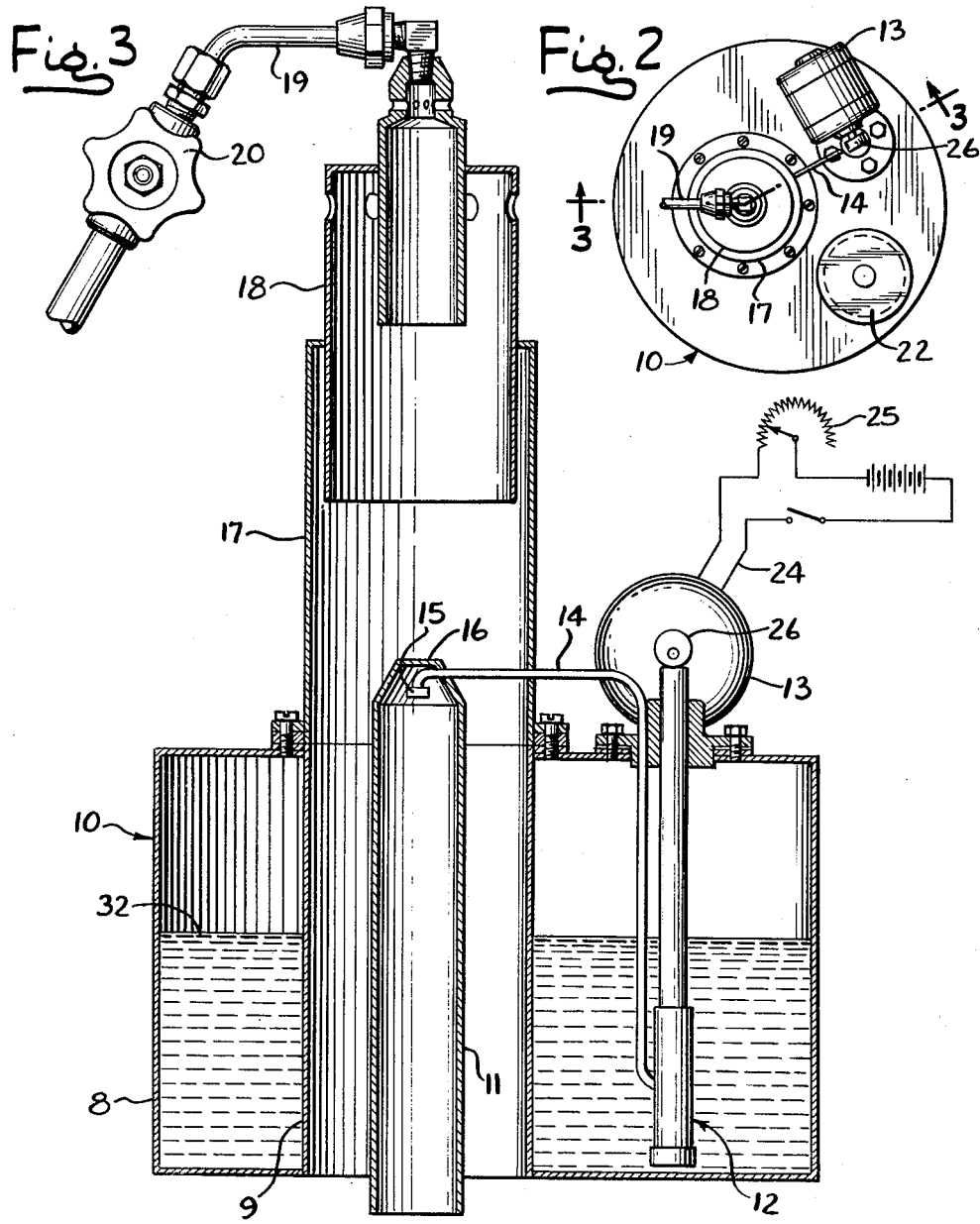

3,162,152
METHOD OF APPLYING A PESTICIDE
Joseph Regenstein, Jr., Chicago, Ill., and Eugene P. Ordas, Gary, Ind., assignors to Velsicol Chemical Corporation, Chicago, Ill., a corporation of Illinois
Filed Feb. 27, 1963, Ser. No. 261,413
5 Claims. (Cl. 111—7)

This invention relates to a method for applying pesticides. More particularly, this invention relates to applying unformulated organic heat stable pesticides to the locus of pests, and particularly to seeds and soil, as a dense fog.

It is known that organic chemical pesticides can be applied to the soil to control pests therein. However, it has heretofore been necessary to formulate or dilute the organic chemical pesticides with solvents, diluents, and the like to facilitate the application of these pesticides. For example, solid pesticides are often dissolved in a solvent and surfactants added to form a water emulsifiable concentrate, or mixed with inert solids to form dusts, or dissolved in a solvent and the solution impregnated onto or into a granulated carrier to form a granular formulation, etc. The resulting compositions are called formulations and often contain a major proportion of inert material. In actual use, these formulations are often further diluted with large amounts of water in order to spread a preselected amount of actual compound over a specified area.

Although formulating has been practiced for at least the past two decades, such formulations required inert materials, such as solvents or diluents, which may be toxic to the object sought to be protected, for example, the solvent in which an insecticide is dissolved may be toxic to the desirable plant on which the formulation is to be sprayed or to animals which may subsequently consume the plant as a part of their diet. Formulation is also undesirable since it increases the cost of application of the pesticide and the amount of material which must be handled in applying the pesticide. There is a presently existing need for a method of applying pesticides to soil which would eliminate formulation and such inert materials, and thus provide substantial economies in cost of material, material handling, safety, and the like, and yet provide effective dispersal.

Therefore, one object of this invention is to provide a method for the application of pesticides to the locus of pests, which does not require formulation with an inert material.

It is another object of this invention to provide a method of applying solid pesticides to soil which provides for adequate dispersal of the pesticides in the soil without use of solvents and diluents.

Another object of this invention is to provide a method by which solid chlorinated hydrocarbon type pesticides of at least technical grade purity can be evenly dispersed in soil without formulation.

Still another object of this invention is to provide a method by which seeds can be treated with pesticides.

These and other objects of the present invention will be readily apparent from the ensuing description.

It has now been discovered that organic heat stable pesticides can be applied to the locus of pests in their unformulated, solvent-free, concentrated form, as a dense fog. As a particular embodiment of this invention, it has now been discovered that solvent-free pesticides can be conveniently applied to soil as a dense fog released beneath the surface of the soil. It has further been found that the dense fog can be readily produced by heating the solvent-free pesticide to a temperature above its softening point and below its boiling point atomizing the melted or liquid pesticide into a fine liquid spray, and vaporizing the spray into a dense fog. A "dense fog" as used herein denotes a suspension of fine droplets of pesticide in air wherein the suspension has the appearance of smoke and its droplets are heavier than air.

"Concentrated pesticide" as used herein denotes a pesticidal production in which the active chemical compound is present in upwards of 50%, and particularly includes technically pure material, such as the material produced by commercial production processes, in which the product therefrom is composed predominantly of the pesticidally active named compound together with lesser proportions of reaction by-products, intermediates, and starting materials. An "unformulated pesticide" as used herein is understood to mean a concentrated pesticide, and particularly the commercially produced product in its unrefined state, to which has not been added any of the solvents and diluents normally added to pesticides in the practice of the pesticide formulation art. The term "solvent-free" pesticide as used herein denotes that the pesticide is free from solvents normally added to the concentrated pesticide after its manufacture has been completed.

More particularly, the dense fog utilized in the method of this invention can be prepared by heating suitable solvent-free pesticide described herein to a first temperature above its softening point, preferably above its melting point, and below its boiling point, to melt the pesticide if normally solid and heat the resulting melted pesticide substantially above its melting point. If a normally liquid pesticide is used, it is heated to assist in the subsequent process steps. The heated liquid pesticide, being a liquid either initially or by melting, can be atomized by passing through atomizing means, such as a spray orifice, by suitable pressure providing means, such as a positive displacement pump, to form fine liquid spray. The spray is then vaporized by suitable means, for example, by passing the vapor through a zone, such as a tube, which is heated to a temperature above the first temperature, preferably from about 250° to about 1000° F., and most preferably from about 300° to about 1000° F. Passage through the heated zone vaporizes the spray into a dense fog.

The fog of the suitable unformulated, solvent-free, concentrated pesticides can be produced by a variety of apparatus which perform the functions heretofore described.

In the accompanying drawings FIG. 1 is a side elevational view illustrating an arrangement of apparatus for carrying out the method of the present invention.

FIG. 2 is a top plan view of the fog producing component of the apparatus shown in FIG. 1.

FIG. 3 is a longitudinal section on the line 3—3 of FIG. 2 showing apparatus for producing the fog of the present invention.

Referring to the drawings, the fog producing component of the apparatus comprises a cylindrical, annular tank 10 defined by the walls 8 and 9, a concentric heated tube 11 disposed within the annular space and spaced apart from inner wall 9, a vibrating positive displacement pump 12 mounted in tank 10 driven by a rotary motor 13 and cam 26, with the pump discharge line 14 feeding into spray nozzle 15 mounted above tube 11 on the center line thereof. Pump discharge line 14 passes through heat shield 16 which is frusto-conical in shape and is mounted on and encloses the upper end of heated tube 11. The annular space between tank 10 and heated tube 11 is enclosed at its upper end by burner housing 17 in which is mounted gas burner 18 at the top thereof directed toward heat shield 16. The gas burner unit 18 is supplied with a suitable gaseous fuel, such as liquid propane gas, through supply line 19 and valve 20. Access to tank 10 is attained through a fill hole which is normally covered by fill hole cover 22. Rotary pump motor 13 is supplied with electricity by leads 24 in which is rheostat 25. Rheostat 25 controls the speed of pump 12 and thus meters the flow of pesticide through spray nozzle 15.

In operation, tank 10 is charged with a suitable pesticide 32, as described herein, through the fill hole. Valve 20 in line 19 is opened and gas burner 18 is lighted. The flame from burner 18 heats heated tube 11 and tank 10, and hence the pesticide within tank 10. Rheostat 25 is adjusted to actuate motor 13 and thus drive pump 12, which forces the heated pesticide through pump discharge line 14 and through spray nozzle 15, atomizing the pesticide into a fine liquid spray. As the spray passes down through heated tube 11, it is vaporized into a dense fog which is discharged through a suitable conduit 21 attached to the lower end of heated tube 11. The fog may then be conducted through conduit 21 to various apparatus, such as directly to planning shoes 28 of a conventional seed planter, a portion of which is shown in FIG. 1, or conventional tumbler-blenders, not shown, to apply the pesticide in the various applications hereinafter described.

The dense fog is dispensed onto the locus of the pest, preferably beneath the surface of the soil 23, and most preferably at a depth of from about two to about six inches below the surface of the soil. It is also preferred to dispense the fog in a sequential process which comprises forming an opening in the soil, dispensing the fog of the pesticide into the opening, and immediately thereafter covering the opening with soil. Various means may be utilized to dispense the dense fog evenly beneath the soil surface in the preferred method of the present invention. Exemplary of such means is planting shoe 28 which slices and spreads open the soil 23 to a preselected depth to provide an opening into which the seed 29 is dropped from hopper 30 and after the shoe 28 has passed, the soil naturally closes and a rear wheel 31 compacts the soil. The dense fog of the pesticide described herein, can readily be dispersed into the opening formed by the planting shoe, before or after the seed has been dropped. Use of the planting shoe in this manner during planting provides rows of planted seed with the pesticide having been evenly dispersed throughout the soil in the planted row, and in addition has the effect of a seed treatment. Such use of the planting shoe to dispense the dense fog of the unformulated pesticide constitutes a preferred embodiment of the present inveniton. The planting shoe may be used in the manner described without seeds, to obtain rows of treated unplanted soil, which may then be planted at a later time.

In another aspect of this invention, seeds are treated with a fog of the pesticides described herein, thus eliminating any contact of the seeds with harmfully toxic solvents. In particular, the treatment comprises placing the seeds in suitable seed-treating means, such as the tumbling type seed treaters exemplified by tumbler-blenders, and dispensing the fog of the pesticide at a metered rate into the device to provide intimate controlled contact between the fog and the seeds. In this manner, even the most ordinarily inaccessible surfaces of the seeds are contacted with the fog and thus the seeds are more effectively and uniformly treated than was previously obtainable with the known seed tratments, such as spraying an aqueous formulation of the pesticide on the seeds.

The method of the present invention may be used with the fogs of a variety of unformulated, solvent-free, concentrated organic heat stable pesticides and mixtures thereof, for example, with the fogs of various unformulated, solvent-free, concentrated insecticides, herbicides, fungicides, nematocides, miticides, soil sterilants, and the like and mixtures thereof, which are heat stable. "Heat stable" as used herein is understood to mean not decomposing upon heating to a temperature above its melting point and below its boiling point. It is particularly advantageous and therefore preferred to apply the fog of unformulated, solvent-free, concentrated solid and highly viscious liquid organic heat stable pesticides by the method of the present invention, particularly where these pesticides cannot normally be applied without formulation with solvents or diluents which are often toxic to desirable plants and animals or leave residues which are similarly toxic.

Generally, it is preferred to apply the fog of unformulated, solvent-free, concentrated heat stable chlorine containing hydrocarbon type pesticides by the method of this invention. Included in the chlorine containing hydrocarbon type pesticides contemplated herein are the chlorine containing hydrocarbon pesticides themselves, such as heptachlor and chlordane, and their commercially available concentrated, unformulated, solvent-free forms, namely, technical heptachlor and technical chlordane. Technical heptachlor is a commercial product which usually contains about 72%, and may contain from about 60% to about 95%, of heptachlor with the remainder being about 28%, but which may vary from about 5% to about 40%, of related compounds occurring in the normal manufacturing process. Technical chlordane is similarly an art-recognized product defined as containing from about 60% to about 75% chlordane and between about 25% and about 40% of related compounds occurring in the normal manufacturing processes which are toxic to insects. Also included in this class of pesticides are those chlorine containing hydrocarbon pesticides which also contain oxygen such as 1,1-bis(p-chlorophenyl)-2-propyn-1-ol, di-(4-chlorophenoxy)-methane, orthophenylphenol; and liquid and low melting solid substituted aromatic acids such as the liquid and low melting solid polychorobenzoic acids, the alkoxy polybenzoic acids, and the like, their liquid and low melting solid lower alkylesters, and mixtures thereof.

In a preferred embodiment of this invention the fog of undiluted, solvent-free technical heptachlor, which is defined above, is utilized. This fog can be prepared by heating the solid to a first temperature of between about 120° and about 220° F. The melted heptachlor is atomized by suitable means, for example, by forcing the melted heptachlor through a spray orifice to form a fine liquid spray. The spray can then be vaporized by heating at a temperature of from about 300° to about 1000° F. to form the dense fog. The vaporization can be performed, for example, by passing the spray through a tube heated at the desired temperature. In the preferred embodiment of the present invention the resulting dense fog is dispensed into an opening formed in the soil and the opening is immediately covered with soil.

In other preferred embodiments of this invention fogs of other unformulated, concentrated solvent-free pesticides and their mixtures shown below are applied beneath the surface of the soil, and are then immediately covered with soil. Also presented below are suitable first temperatures to which the pesticide may be heated in the tank 10.

Pesticide: First temperature range, ° F.
(1) Technical chlordane _____ 120–180
(2) 2-methoxy-3,6-dichlorobenzoic acid _____ 180–240
(3) Mixture of 10 to 90 parts by weight technical heptachlor and 10 to 90 parts by weight technical chlordane _____ 120–180
(4) Mixture of 40 to 60 parts by weight technical aldrin[1] and 40 to 60 parts by weight technical chlordane _____ 120–200
(5) Mixture of 30 to 70 parts by weight technical aldrin[1] and 20 to 70 parts by weight technical heptachlor _____ 110–180
(6) Mixture of 30 to 70 parts by weight lower alkyl ester of 2-methoxy-3,6-dichlorobenzoic acid and 30 to 70 parts by weight technical heptachlor _____ 120–180
(7) Mixture of 10 to 50 parts by weight DDT and 50 to 90 parts by weight toxaphene ____ 120–180

[1] Technical aldrin is a commercially produced material containing at least 82% aldrin. Aldrin is an insecticidal product containing at least 95% of 1,2,3,4,10,10-hexachloro-1,4,4a-5,8,8a-hexahydro-1,4-endo, exo-5,8-dimethanonaphthalene and the remainder related chlorinated hydrocarbons having insecticidal activity.

The method of the present invention will be readily understood from the following examples. While a few specific pesticides and their mixtures are used in these examples to illustrate the method of applying organic heat-stable pesticides to soil and its effectiveness, it is understood that the other pesticides and mixtures thereof may be similarly employed.

*Example I*

The apparatus illustrated in the accompanying drawings was erected upon movable means such that the equipment could form planted rows. Tube 11 was heated at from 600° to 1000° F. The discharge of the heated tube 11 was piped to a planting shoe 28.

The tank 10 was charged with technical heptachlor and then heated at 140° F. until the solid melted into liquid 32. The melted material was then pumped at a controlled rate through the spray nozzle 15 where it was atomized into a liquid spray. The spray was passed through the heated tube 11 where it was vaporized. The equipment described above together with corn seed planting equipment traversed the test plots at a rate of ten miles per hour. The planting shoe 28 sliced open and spread the toil 23 to a depth of about three inches. The vaporized spray from the heated tube 11 and conduit 21 was then discharged through the shoe as a dense fog at an output rate of 2.5 to 3 ounces per minute which settled into the ground across the width of the shoe. Immediately thereafter, a corn seed was dropped into the opening, and the rear structure of the planting shoe closed the opening in the soil and then wheel 31 compacted the soil. Thus, planted rows of corn seeds, the center of each row approximately forty inches from the center of the adjacent row were planted, with the soil in the row and the seeds therein treated with technical heptachlor of 72% purity at a rate of 1.38 pounds per acre, equal to a treatment of 1 pound of actual heptachlor per acre.

*Example II*

To demonstrate the effectiveness of the method of the present invention, the application described in Example I was repeated utilizing a mixture of technical heptachlor and an equal quantity by weight of commercial heavy aromatic naptha composed of 85–86% aromatics and having the following typical properties; specific gravity at 60° F. of 0.926, equivalent pounds per gallon of 7.71, flash point (Cleveland Open Cup) of 136° F., an initial boiling point of 334° F., a final boiling point of 533° F., a mixed aniline point of 25 degrees and a kauributanol number of 100; wherein the heavy aromatic naphtha was added solely to lower the viscosity of the melted technical heptachlor so it could be readily pumped at 140° F. with a low powered positive displacement pump.

Adjacent plots were planted without the heptachlor treatment. Four replicates of each plot were utilized. Both the untreated plots and treated plots were heavily infested with corn rootworm, *Diabrotica longicornis*, before planting.

The plots were observed approximately 2½ months after planting and the amount of lodged plants determined. The results of this test showed that the use of the method of the present invention to apply technical heptachlor beneath the surface of soil afforded a high degree of control over the corn rootworm as compared to untreated plots. This result compared favorably with similar tests utilizing various formulations of insecticides at various concentrations applied by the common methods, for example spraying of aqueous solutions of the formulations.

*Example III*

The equipment utilized in Examples I and II is also utilized in this example. The tank 10 is charged with technical chlordane and heated at 150° F., until the material flowed readily. The heated material is then pumped through spray nozzle 15 into tube 11, forming a spray. This spray is then passed through the heated tube 11 where it is vaporized. As the equipment traverses test plots, the vaporized spray from the heated tube 11 is discharged into the planting shoe as a dense fog. Due to its density, the fog settles onto the soil in the opening formed by the shoe, and the opening is closed by the forward movement of the planting shoe. The soil is then compacted by rear wheel 31. In this manner rows of soil treated with chlordane at a depth of two to six inches are formed.

*Example IV*

2-methoxy-3,6-dichlorobenzoic acid, is charged into the tank 10 of the equipment utilized in the previous examples and heated at 220° F. until the solid is melted. The melted material is processed as described in the previous examples and the resulting dense fog is dispersed into the planting shoe. The fog settles onto the soil and is covered with soil by the forward movement of the planting shoe. In this manner rows of soil treated with 2-methoxy-3,6-dichlorobenzoic acid are formed.

The procedure and equipment detailed in Examples I–IV can be utilized in applying the other organic heat stable pesticides contemplated by the present invention. In illustration thereof, in Examples V–XII below, several pesticides and mixtures thereof are presented which can be applied by the procedure of the previous examples. Also presented are typical temperatures, designated as the first temperature, at which the pesticide may be heated either to melt the pesticide if solid or to heat the pesticide if a liquid in the preparation of the fog.

| Example | Pesticide | First Temperature, ° F. |
|---|---|---|
| V | Di-(4-chlorophenoxy)methane | 160 |
| VI | Ethyl 2,4,5-trichlorobenzoate | 155 |
| VII | Phenyl ortho-chlorobenzoate | 110 |
| VIII | Mixture of 40% by weight technical heptachlor and 60% by weight technical chlordane. | 150 |
| IX | Mixture of 50% by weight technical aldrin and 50% by weight technical chlordane. | 140 |
| X | Mixture of 50% by weight technical aldrin and 50% by weight technical heptachlor. | 120 |
| XI | Mixture of 50% by weight ethyl 2-methoxy-3,6-dichlorobenzoate and 50% by weight technical heptachlor. | 140 |
| XII | Mixture of 33⅓% by weight DDT and 66⅔% by weight toxaphene. | 140 |

We claim:

1. In a method for the application of pesticides into the soil the improvement which comprises applying into the soil a fog of a concentrated, solvent-free, organic pesticide having a softening point and a boiling point, said fog being obtained by heating the pesticide to a first temperature above its softening point and below its boiling point, atomizing the heated pesticide into a liquid spray and vaporizing the liquid spray by heating the spray at an elevated temperature above the first temperature.

2. In a method for the application of pesticides into the soil the improvement which comprises applying into the soil a fog of a concentrated, solvent-free, organic chlorine-containing pesticide having a softening point and a boiling point, said fog being obtained by heating the pesticide to a first temperature above its softening point and below its boiling point, atomizing the heated pesticide into a liquid spray and vaporizing the liquid spray by heating the spray at an elevated temperature above the first temperature.

3. In a method for the application of pesticides into the soil the improvement which comprises applying into the soil a fog of a concentrated, solvent-free, organic chlorine-containing pesticide having a softening point and a boiling point, said fog being obtained by heating the pesticide to a first temperature above its softening point and below its boiling point, atomizing the heated pesticide into a liquid spray and vaporizing the liquid spray by heating the spray at an elevated temperature above about 250° F.

4. In a method for the application of solvent-free technical heptachlor into the soil the improvement which comprises applying into the soil a fog of solvent-free technical heptachlor obtained by heating the solvent-free technical heptachlor to a first temperature of between about 120° and about 200° F., atomizing the melted technical heptachlor into a spray and vaporizing the liquid spray by heating at a temperature of from about 300° F. to about 1000° F.

5. In a method for the application of solvent-free technical chlordane into the soil the improvement which comprises applying into the soil a fog of solvent-free technical chlordane obtained by heating the solvent-free technical chlordane to a first temperature between about 120° and about 180° F., atomizing the heated technical chlordane into a liquid spray and vaporizing the spray by heating to a temperature of from about 300° F. to about 1000° F.

References Cited by the Examiner

UNITED STATES PATENTS

| 261,558 | 7/82 | Lambert | 111—7 |
| 992,140 | 5/11 | Anderberg et al. | 111—6 |
| 1,409,564 | 3/22 | Mitchell. | |
| 1,970,163 | 8/34 | Brandus | 167—38 |
| 2,889,788 | 6/59 | Van Dorn | 111—80 |
| 2,903,982 | 9/59 | Floy | 111—7 |
| 2,968,266 | 1/61 | Gustafson | 111—80 |

ABRAHAM G. STONE, *Primary Examiner.*